US009413851B2

(12) United States Patent
Sakui et al.

(10) Patent No.: US 9,413,851 B2
(45) Date of Patent: Aug. 9, 2016

(54) INFORMATION PROCESSING SYSTEM, INFORMATION PROCESSING DEVICE, CLIENT TERMINAL, AND COMPUTER READABLE MEDIUM

(71) Applicant: PFU LIMITED, Kahoku-shi, Ishikawa (JP)

(72) Inventors: Masahito Sakui, Ishikawa (JP); Yoshinobu Araya, Ishikawa (JP); Yoshihisa Taira, Ishikawa (JP)

(73) Assignee: PFU Limited, Ishikawa (JP)

( * ) Notice: Subject to any disclaimer, the term of this patent is extended or adjusted under 35 U.S.C. 154(b) by 273 days.

(21) Appl. No.: 13/665,213

(22) Filed: Oct. 31, 2012

(65) Prior Publication Data

US 2013/0204926 A1      Aug. 8, 2013

(30) Foreign Application Priority Data

Oct. 31, 2011      (JP) .................................. 2011-239295

(51) Int. Cl.
*G06F 15/16* (2006.01)
*H04L 29/06* (2006.01)
*H04L 12/26* (2006.01)
*H04L 29/08* (2006.01)

(52) U.S. Cl.
CPC ............ *H04L 67/42* (2013.01); *H04L 43/0817* (2013.01); *H04L 43/10* (2013.01); *H04L 67/025* (2013.01); *H04L 67/10* (2013.01)

(58) Field of Classification Search
CPC ............................. H04L 29/06; H04L 67/10

USPC ......................................................... 709/203
See application file for complete search history.

(56) References Cited

U.S. PATENT DOCUMENTS

| 6,192,388 B1 * | 2/2001 | Cajolet .......................... 718/100 |
| 2007/0294380 A1 | 12/2007 | Natarajan et al. |
| 2010/0095302 A1 | 4/2010 | Kato et al. |
| 2011/0131583 A1 | 6/2011 | Geraci |

FOREIGN PATENT DOCUMENTS

| CN | 101072233 A | 11/2007 |
| CN | 101652750 A | 2/2010 |

(Continued)

OTHER PUBLICATIONS

Japanese Office Action issued in Japanese Application No. 2011-239295 dated Mar. 31, 2015.

(Continued)

*Primary Examiner* — Hua Fan
(74) *Attorney, Agent, or Firm* — McDermott Will & Emery LLP (57) ABSTRACT

There is provided an information processing system including: a client terminal; and a management server that manages the client terminal, wherein: the client terminal includes a transmission section that transmits notification data containing information denoting an operation state of at least an own machine; and the management server includes: a reply section that sends back reply information in return for notification data from the client terminal; and an information insertion section that inserts task information about a task of the client terminal into the reply information.

7 Claims, 12 Drawing Sheets

(56) References Cited

FOREIGN PATENT DOCUMENTS

| | | | |
|---|---|---|---|
| CN | 102223257 | A | 10/2011 |
| JP | 8-249163 | A | 9/1996 |
| JP | 2002-269060 | A | 9/2002 |
| JP | 2007-334898 | A | 12/2007 |
| JP | 2008-242983 | A | 10/2008 |
| JP | 2011-065645 | A | 3/2011 |

OTHER PUBLICATIONS

English translation of Japanese Office Action issued in Japanese Application No. 2011-239295, dated Jan. 23, 2015.

English translation of Chinese Office Action dated Jun. 26, 2015 issued in corresponding Chinese Patent Application No. 201210422876.6.

English translation of Chinese Non-Final Office Action issued in Application No. 201210422876.6 dated Mar. 2, 2016.

* cited by examiner

| Task information ID | Task type | Priority order | Relevant task ID | Presence/ absence of delivery file | Data size | Version No. | Time required in application |
|---|---|---|---|---|---|---|---|
| 1 | Update A | 4 | XXX | Present | 1500Byte | V2.02.14 | 50sec. |
| 2 | Service stop | 3 | YYY | Absent | — | — | — |
| 3 | Reactivate | 1 | XXX | Absent | — | — | — |
| 4 | Maintenance log Collection | 5 | — | Absent | — | — | — |
| 5 | Update B | 2 | YYY | Present | 300Byte | V14L010 | 30sec. |
| ... | ... | ... | ... | ... | ... | ... | ... |

HEARTBEAT NOTIFICATION RESPONSE PROCESSING (S50)

FIG. 8

HEARTBEAT TRANSMISSION PROCESSING (S70)

FIG. 9

TASK APPLICATION PROCESSING BASED ON
PRIORITY ORDER (S80)

FIG. 10

ROLLBACK PROCESSING UPON FAILURE IN
RELEVANT-TASK APPLICATION (S90)

FIG. 11

| Terminal ID | Application task information ID | Application state | Application status |
|---|---|---|---|
| 1 | 3 | Being applied | 60% |
| 2 | 1 | Already applied | 100% |
| 2 | 3 | Being applied | 45% |
| 2 | 5 | Waiting for application | 0% |
| 3 | 4 | Already applied | 100% |
| 3 | 7 | Unnecessary for application | — |
| 4 | 2 | Suspended application | 0% |
| 5 | 8 | Error in application | 0% |
| ... | ... | ... | ... |

FIG. 12

| Terminal ID | Relevant task ID | Application state | Relevant task application status |
|---|---|---|---|
| 1 | XXX | Being applied | 25% |
| 2 | YYY | Waiting for application | 0% |
| 3 | ZZZ | Already applied | 100% |
| 4 | YYY | Unnecessary for application | — |
| 5 | ZZZ | Error in application | 0% |
| 6 | XXX | Suspended application | 0% |
| ... | ... | ... | ... |

INFORMATION PROCESSING SYSTEM, INFORMATION PROCESSING DEVICE, CLIENT TERMINAL, AND COMPUTER READABLE MEDIUM

CROSS-REFERENCE TO RELATED APPLICATIONS

This application is based on and claims priority under 35 USC 119 from Japanese Patent Application No. 2011-239295 filed Oct. 31, 2011.

FIELD

The invention relates to an information processing system, an information processing device, a client terminal, and a computer readable medium.

BACKGROUND

JP2007-334898(A1) discloses a data delivery system including a reception section that receives, from a plurality of clients, request information having identification data of the clients in a predetermined period of time, a test section that identifies the plurality of clients based on the identification data, an alarm section that generate an alarm signal about the clients who are yet to transmit the request information in the predetermined period of time, a generation section that generates response data for an arbitrary one of the clients who is identified by the test section, and a transmission section that transmits the response data to the arbitrary client.

SUMMARY

According to an aspect of the invention, there is provided an information processing system including: a client terminal; and a management server that manages the client terminal, wherein: the client terminal includes a transmission section that transmits notification data containing information denoting an operation state of at least an own machine; and the management server includes: a reply section that sends back reply information in return for notification data from the client terminal; and an information insertion section that inserts task information about a task of the client terminal into the reply information.

According to another aspect of the invention, there is provided an information processing device including: a reply section that sends back reply information in return for notification data from a client terminal; and an information insertion section that inserts task information about a task to be performed by the client terminal into the reply information.

According to another aspect of the invention, there is provided a client terminal including: a transmission section that transmits notification data containing information denoting an operation state of at least an own machine; a preprocessing section that performs a preprocessing required in performance of a task in accordance with reply information for notification data transmitted from the transmission section; and a performance section that performs the task after the preprocessing is performed by the preprocessing section.

According to another aspect of the invention, there is provided a non-transitory computer-readable medium storing thereon a computer program that causes a computer to perform the steps of: sending back reply information in return for data notification from client terminal; and inserting task information about a task of the client terminal into the reply information.

According to another aspect of the invention, there is provided a non-transitory computer-readable medium storing thereon a computer program that causes a computer to perform the steps of: transmitting notification data containing information denoting an operation state of at least an own machine; performing a preprocessing required in performance of a task in accordance with reply information for the transmitted notification data; and performing the task after the preprocessing.

BRIEF DESCRIPTION OF DRAWINGS

Exemplary embodiments of the present invention will be described in detail based on the following figures.

DESCRIPTION OF EMBODIMENT

The following will describe embodiments of the invention with reference to the drawings.

Figure 1:
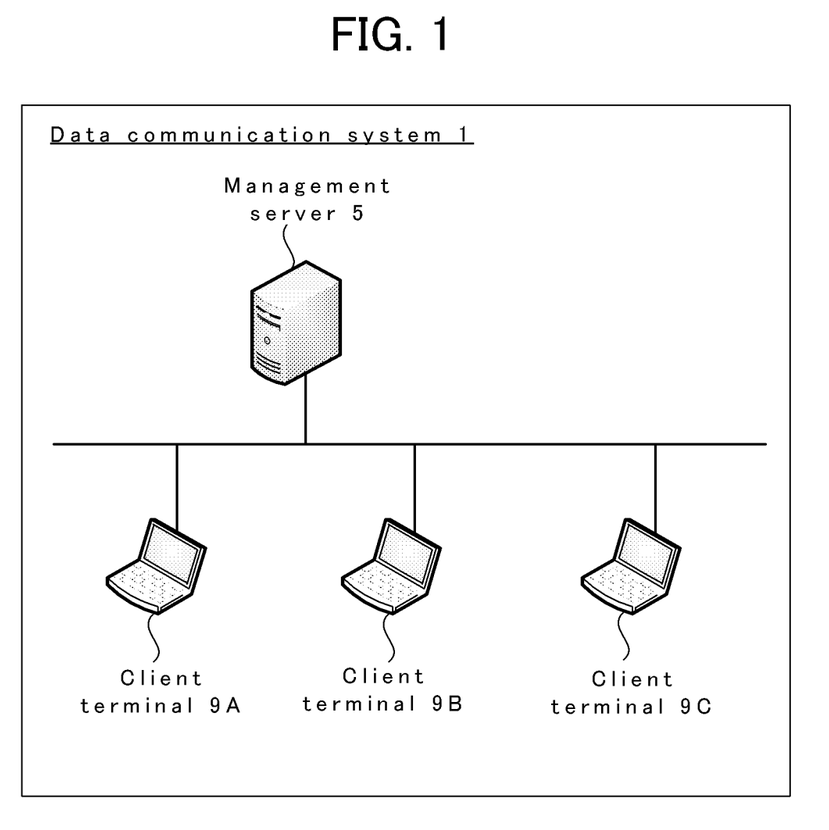
FIG. 1 is an explanatory view of an outline of a data communication system 1.

FIG. 1 is an explanatory view of an outline of a data communication system 1.

As illustrated in FIG. 1, the data communication system 1 of the embodiment includes a management server 5 and clients 9A to 9C. The management server 5 is a computer terminal and has server functions. The clients 9 are each a computer terminal and connected via a network to the management server 5. The client terminal 9 may come in, for example, an information terminal or an ATM machine disposed to various sites and a target to be managed by the server 5.

For example, between the management server 5 and the client terminals 9, a firewall is provided to allow only some communication protocols such as http and https.

When the client terminal 9 transmits a heartbeat to the management server 5 through http communication, the management server 5 monitors the operation status (dead or alive) of the client terminals 9 beyond the firewall.

Figure 2:
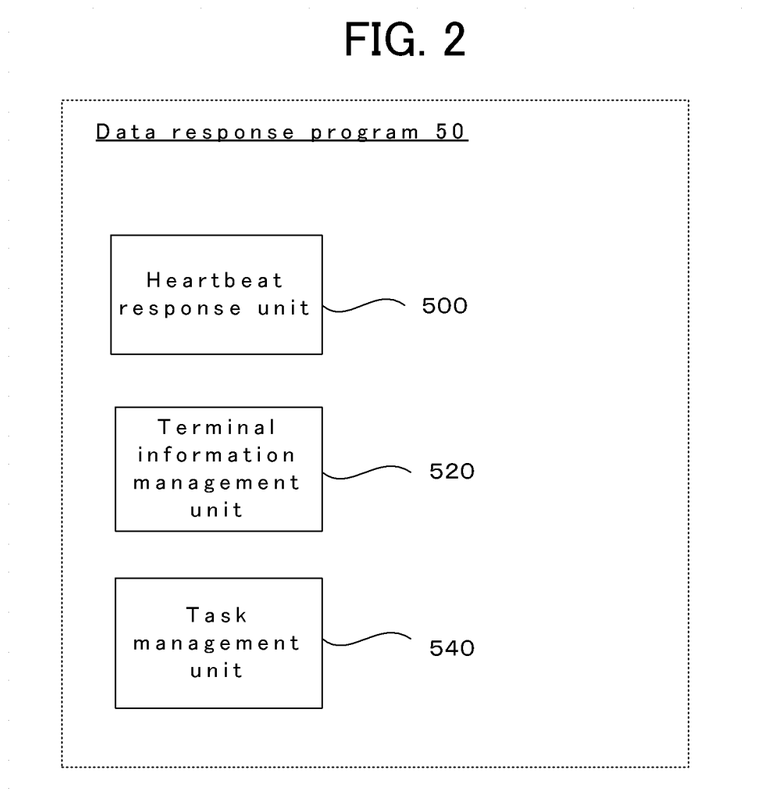
FIG. 2 is an explanatory diagram of a functional configuration of a data response program 50.

FIG. 2 is an explanatory diagram of the functional configuration of a data response program 50.

As illustrated in FIG. 2, the data response program 50 includes a heartbeat response unit 500, a terminal information management unit 520, and a task management unit 540.

The data response program 50 is a computer program installed in the management server 5 through a recording medium such as a CD-ROM.

The heartbeat response unit 500 sends back reply information in return for data posted from by the client terminal 9. More specifically, the heartbeat response unit 500 posts an operation status of the client terminal which has received the heartbeat notification to the terminal information management unit 520 and the task management unit 540. Further, the heartbeat response unit 500 inserts information posted from any other component into the heartbeat notifying reply information and posts it to the client terminal 9.

The terminal information management unit 520 performs acquisition and updating of information to a terminal information management table held by a terminal information DB600. The terminal information management table maintains identification information (MAC addresses etc.) of the client terminals 9 and the operation statuses thereof. More specifically, the terminal information management unit 520 updates the terminal information management table based on the operation status of the client terminal 9 posted from the heartbeat response unit 500.

The heartbeat response unit 500 is one example of a reply section of the invention. Further, a combination of the heartbeat response unit 500, the terminal information management unit 520, and the task management unit 540 is one example of an information insertion section of the invention. A task in the specification refers to a processing which is performed by the client terminal, such as a processing to update software installed in an own machine, create backup data, etc.

Figure 3:
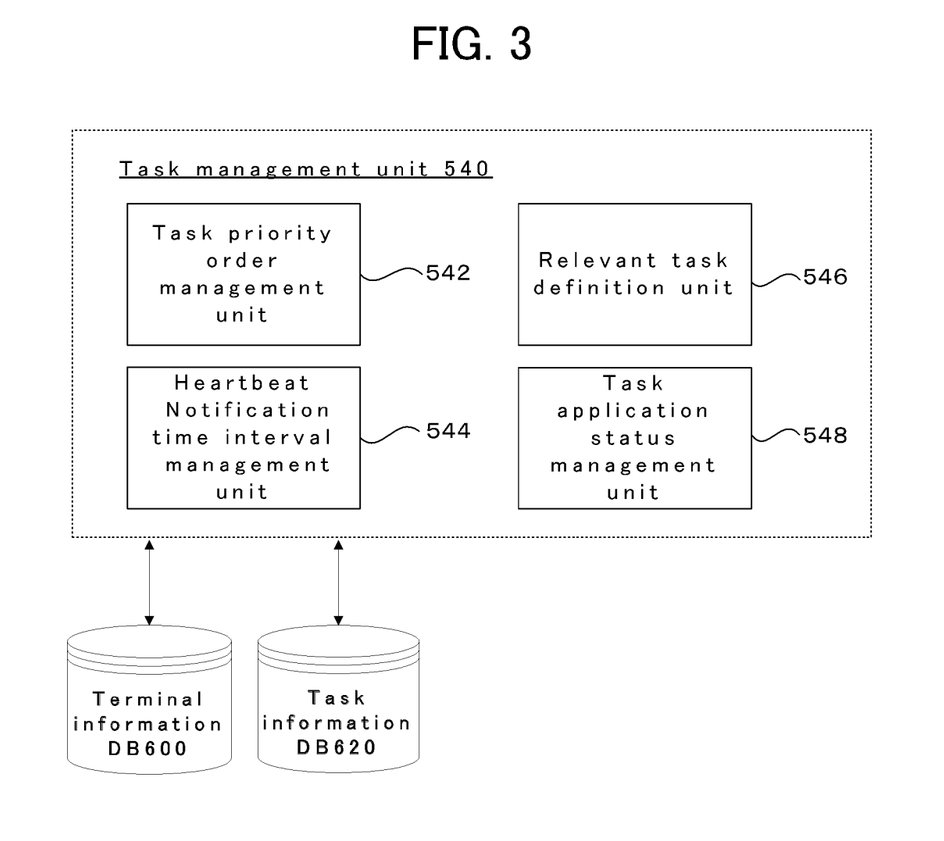
FIG. 3 is a detailed explanatory diagram of a task management unit 540.

FIG. 3 is a detailed explanatory diagram of the task management unit 540.

As illustrated in FIG. 3, the task management unit 540 a task priority order management unit 542, a heartbeat notification time interval management unit 544, a relevant task definition unit 546, and a task application-status management unit 548.

The task management unit 540 performs acquisition and updating of task information to task information DB620. Task information in the specification refers to information relating to a task, for example, attribute information of the task. The information is acquired from and updated in a task information management table held by the task information DB620.

Figure 4:
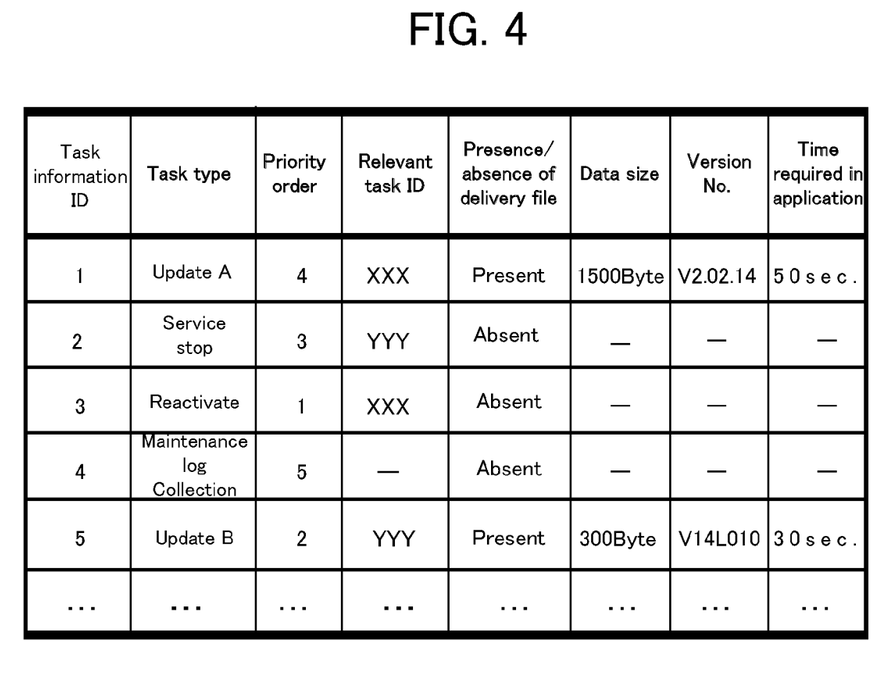
FIG. 4 is a table illustrating a task information management table.

FIG. 4 is a table illustrating the task information management table.

As illustrated in FIG. 4, the task information management table holds task ID information, a task type, a task priority order, a relevant task ID, presence/absence of delivery file, a data size, version No., and a time required in application. The presence/absence of delivery file denotes whether it is necessary to deliver a data file necessary in performance of a task to the client terminal 9. The task information in this example further contains a timing that the data file required in a task should be requested and a data notification time interval related to the task. The task type denotes the type of a task. The task priority order denotes a priority order in which the task is to be performed. The relevant task ID denotes information required to identify other tasks related to each other, for example, the ID of a task to be performed next. The data size denotes a data size of a delivery file (that is, data file required in performance of the task). The version No. denotes that of a delivery file. The time required in application denotes a reference time required to perform a task.

The task priority order management unit 542 determines a task which is to be posted to the client terminal 9, in accordance with a preset task priority order. Specifically, if the heartbeat response unit 500 has received a heartbeat from the client terminal 9, the task priority order management unit 542 selects tasks having a higher priority order from among the tasks registered in the task information management table at the time of reception of the heartbeat, based on the information (ID etc.) of this client terminal 9. Thus, if there is a plurality of tasks to be posted to the client terminal 9, the information of one of the tasks that has the highest priority order is posted to the client terminal 9. The task priority order management unit 542 instructs the heartbeat response unit 500 to insert task information of the selected task into reply information for the heartbeat.

The heartbeat notification time interval management unit 544 sets a data notification time interval that denotes a time interval at which the client terminal 9 should transmit notification data (specifically, heartbeat). For example, the heartbeat notification time interval management unit 544 acquires a heartbeat notification time interval related to task information from the task management table and posts the acquired heartbeat notification time interval to the heartbeat response unit 500. Further, the heartbeat notification time interval management unit 544 can change the heartbeat notification time interval of the client terminal 9 to an arbitrary value in accordance with an instruction from a manager.

The relevant task definition unit 546 relates a plurality of tasks to be performed in a serial order to each other as relevant tasks and then posts the plurality of related tasks to the heartbeat response unit 500 in a predetermined order.

The task application status management unit 548 manages a task notification status (whether task information is notified already or not) and a task performance status (whether a task is being performed, performed already, has failed to be performed, or yet to be performed) for each of the client terminals. Specifically, the task application status management unit 548 holds a task application status management table which manages the task application status for each of the client terminals and a relevant task application status management table which manages the relevant task application status for each of the client terminals and updates those tables based on the information (task performance status etc.) contained in the heartbeat. The task application status management table and the relevant task application status management table are stored in the terminal information DB600.

Figure 5:
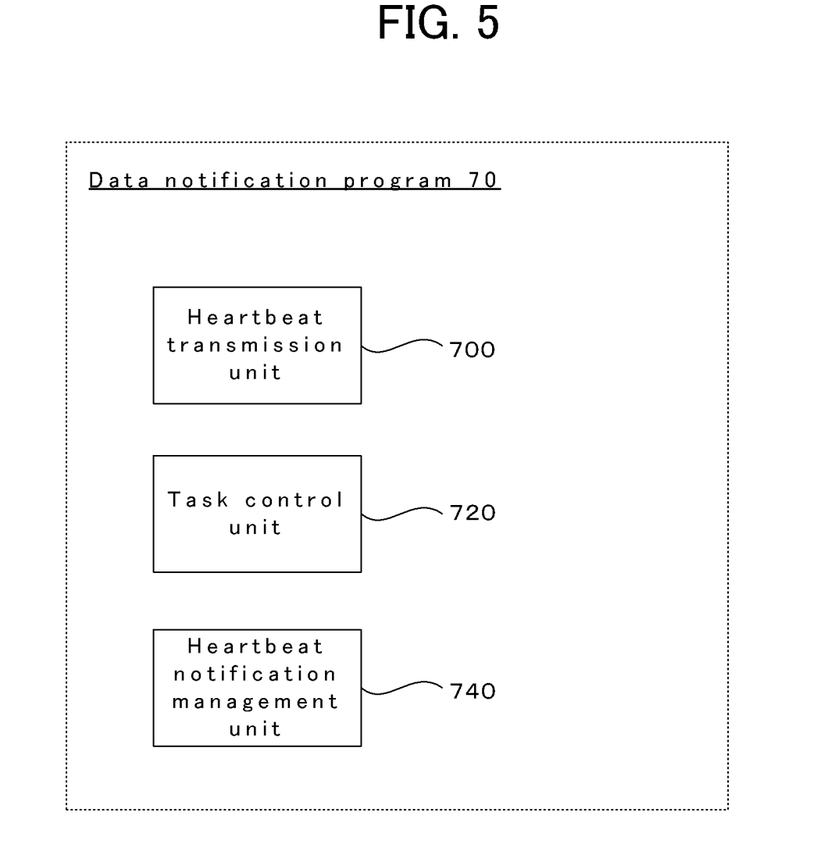
FIG. 5 is an explanatory diagram of a functional configuration of a data notification program 70.

FIG. 5 is an explanatory diagram of the functional configuration of a data notification program 70.

As illustrated in FIG. 5, the data notification program 70 includes a heartbeat transmission unit 700, a task control unit 720, and a heartbeat notification management unit 740.

The data notification program 70 is, for example, a computer program installed in the client terminals 9A to 9C through a recording medium such as a CD-ROM.

The notification in this example refers to a heartbeat, which periodically notifies that the client terminal, is at least on operation through http communication.

The heartbeat transmission unit 700 transmits notification data contained in the information that denotes the operation status of at least the own machine, to the management server 5. For example, the heartbeat transmission unit 700 inserts an operation status of the client terminal 9 itself, a task application status, and task application results into a packet of the heartbeat and periodically transmits them to the management server 5. Further, the heartbeat transmission unit 700 notifies the task control unit 720 of task information (information contained in reply information for the heartbeat) received from the management server 5. Moreover, the heartbeat transmission unit 700 acquires a data file required to perform a task, from the management server 5. The heartbeat transmission unit 700 may acquire the data file required to perform the task from any other server (for example, an access destination specified by the management server 5).

Figure 6:
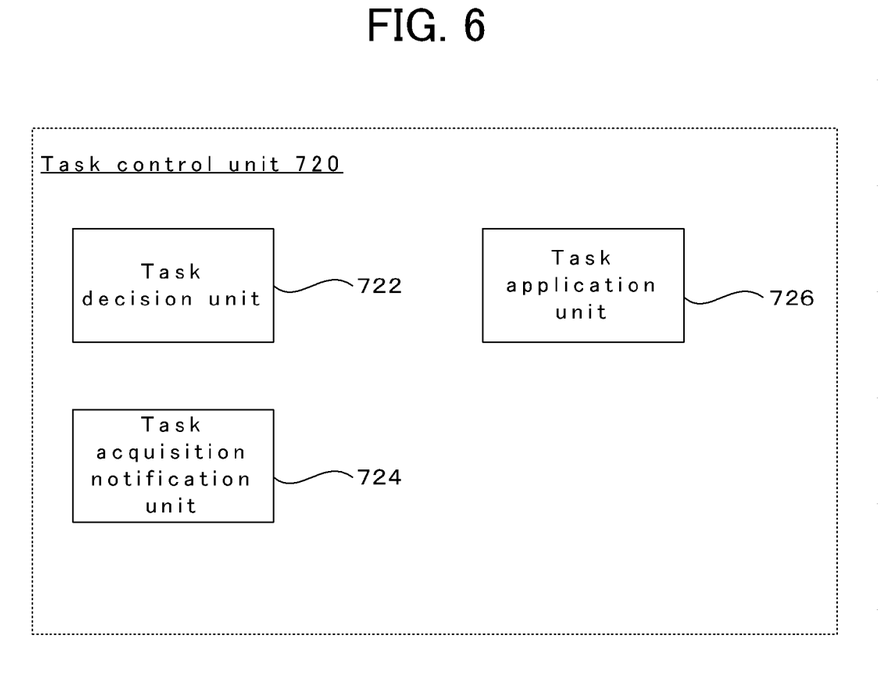
FIG. 6 is a detailed explanatory diagram of a task control unit 720.

The task control unit 720 performs a preprocessing required to perform the task and then performs the task. The task control unit 720 includes a task decision unit 722, a task acquisition notification unit 724, and a task application unit 726.

The task decision unit 722 decides whether performance of a task is necessary or not based on a task type contained in the reply information posted from the management server 5. For example, the task decision unit 722 decides whether the task can be applied to itself based on the task type. Furthermore, the task decision unit 722 acquires the current processing state thereof to decide whether the task can be applied or not. If there is a task being processed currently, the task decision unit 722 compares the priority order of the task being processed currently and that of the task posted from the management server 5, to instruct the task application unit 226 to "continue" or "cancel" the current task based on the priority order.

In the case of a task for which a data file needs to be acquired, the task acquisition notification unit 724 holds a timing for acquisition of the data file posted along with the task information from the management server 5. If the data file acquisition timing held therein has arrived, the task acquisition notification unit 724 requests the heartbeat transmission unit 700 to acquire the data file.

The task application unit 726 performs the task in accordance with the task information or relevant task information posted via the heartbeat reply information and posts completion of the performance to the management server 5. For example, the task application unit 726 performs the task and temporarily holds results of applying the performed task and a progression status of the task being performed in a file or a memory. At the same time as holding them, the task application unit 726 instructs the heartbeat transmission unit 700 to transmit the task application results to the management server. Moreover, if the performance of the relevant task has failed halfway, the task application unit 726 recovers the already performed relevant task to its state before the task performance.

The heartbeat notification management unit 740 holds a heartbeat notification time interval posted from the management server 5. The heartbeat notification management unit 740 requests the heartbeat transmission unit 700 to post a heartbeat periodically in accordance with the heartbeat notification time interval. If the heartbeat reply information is not received from the heartbeat transmission unit 700, the heartbeat notification management unit 740 changes the set heartbeat notification time interval to a prescribed notification time interval (default value) owned by the client terminal.

Figure 7:
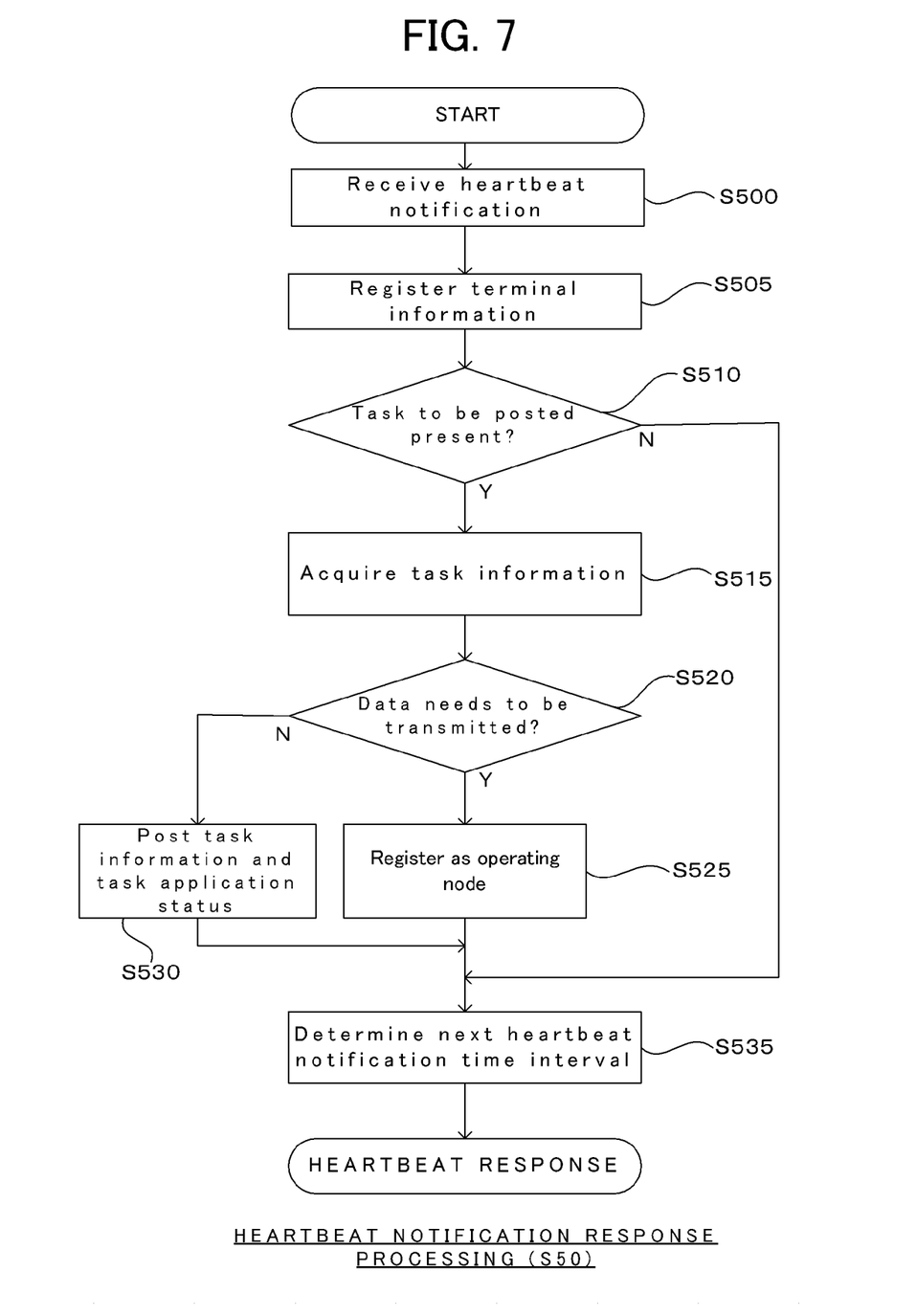
FIG. 7 is an explanatory flowchart of a response processing (S50) for heartbeat notification.

FIG. 7 shows a response processing (S50) for heartbeat notification.

As illustrated in FIG. 7, in step 500 (S500), the heartbeat response unit 500 receives heartbeat notification from the client terminal 9. Further, the heartbeat response unit 500 posts the heartbeat notification to the terminal information management unit 520 and the task management unit 540.

In step 505 (S505), the terminal information management unit 520 registers identification information and an operation status of the client terminal 9 in the terminal information DB600.

In step 510 (S510), the task management unit 540 references the task information table to decide whether or not there is a task to be posted to the client terminal 9 from which the heartbeat notification is received.

If there is the task, the heartbeat notification response processing (S50) shifts to S515. If there is no task, the heartbeat notification response processing (S50) shifts to S535.

In step 515 (S515), the task management unit 540 acquires task information to be posted to the client terminal 9, from the task information table.

In step 520 (S520), the task management unit 540 references the task information table to decide whether or not it is necessary to transmit a data file to the client terminal 9 about the task to be posted.

If it is necessary to transmit the data file, the heartbeat notification response processing (S50) shifts to S525. If it is not necessary to transmit the data file, the heartbeat notification response processing (S50) shifts to S530.

In step 525 (S525), the task management unit 540 acquires task acquisition enabling time and task information from the task information table and posts them to the heartbeat response unit 500.

In step 530 (S530), the task management unit 540 acquires the task information and a task application status from the task information table and posts them to the heartbeat response unit 500.

In step 535 (S535), the heartbeat notification time interval management unit 544 determines a heartbeat notification time interval which is related to the task and requests for its posting to the heartbeat response unit 500. If there is no task to be posted, the heartbeat notification time interval management unit 544 does not change the heartbeat time interval but causes the previously posted heartbeat time interval to be posted again.

The heartbeat response unit 500 notifies the client terminal 9 of the posted information.

Figure 8:
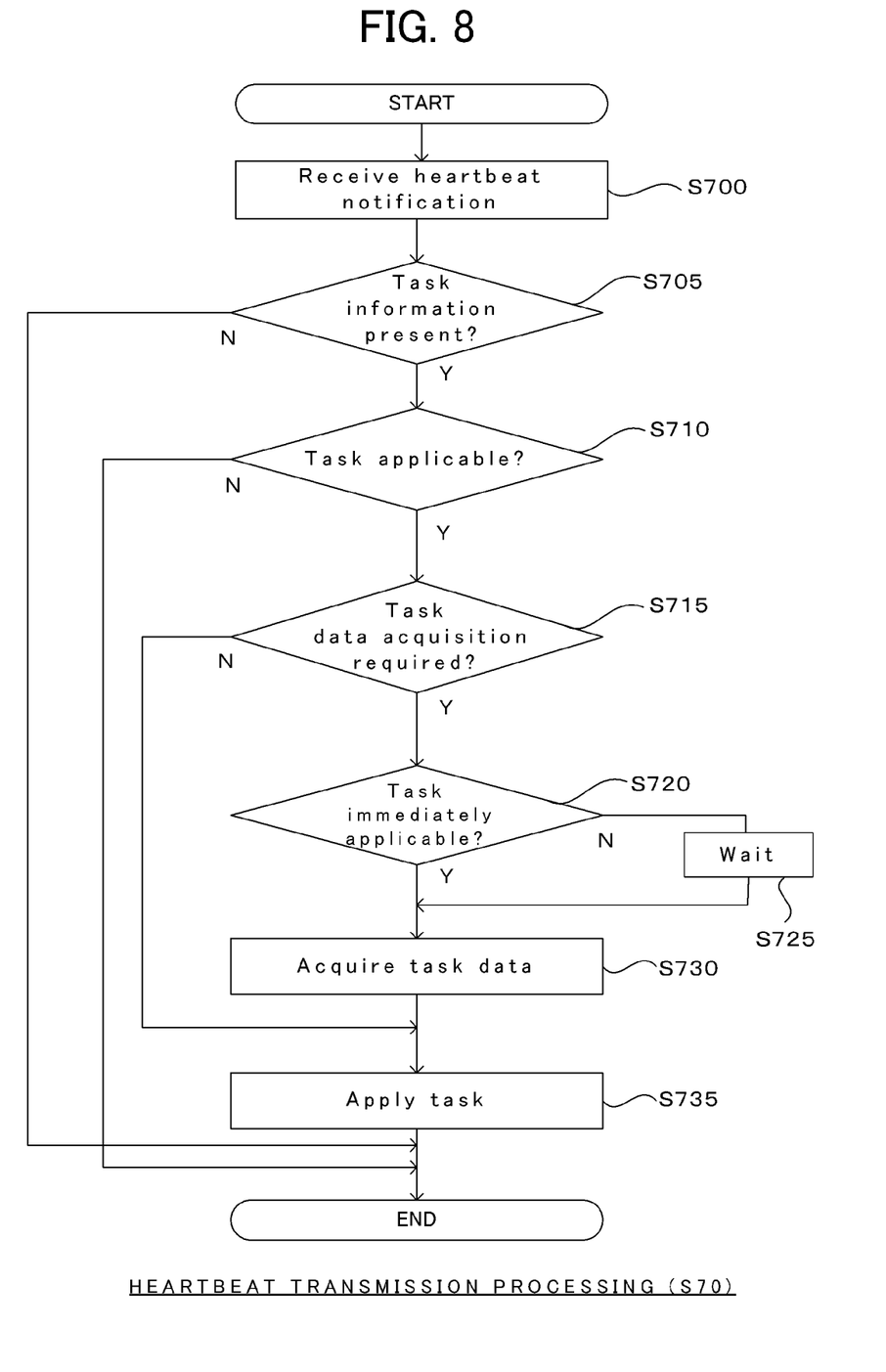
FIG. 8 is an explanatory flowchart of a heartbeat transmission processing (S70) by a client terminal 9.

FIG. 8 shows a heartbeat transmission processing (S70) by a client terminal 9.

As illustrated in FIG. 8, in step 700 (S700), the heartbeat transmission unit 700 receives a heartbeat notification response from the management server 5.

In step S705 (S705), if the received information has the task information, the heartbeat transmission processing (S70) shifts to S710 and, if it does not, ends.

In step 710 (S710), the task decision unit 722 decides whether the posted task can be applied to the own machine. If it is applicable, the heartbeat transmission processing (S70) shifts to S715 and, it is not applicable, ends.

In step 715 (S715), the task decision unit 722 decides whether the posted task needs to acquire data. If it is needed, the heartbeat transmission processing (S70) shifts to S720 and, if it is not needed, shifts to S735.

In step 720 (S720), the task decision unit 722 decides whether the posted task can be applied immediately. If it is applicable immediately, the heartbeat transmission processing (S70) shifts to S730. If it is not applicable immediately, the heartbeat transmission processing (S70) shifts to step 725.

In step 725 (S725), the task acquisition notification unit 724 waits until a task acquisition time arrives. If the task acquisition time arrives, the heartbeat notification response processing (S10) shifts to step 730.

In step 730 (S730), the task acquisition notification unit 724 notifies the heartbeat transmission unit 700 of task acquisition to the management server 5.

In step 735 (S735), the task application unit 726 applies the posted task and notifies the heartbeat transmission unit of results of the application. The heartbeat transmission unit 700 posts the task application results to the management server 5.

Figure 9:
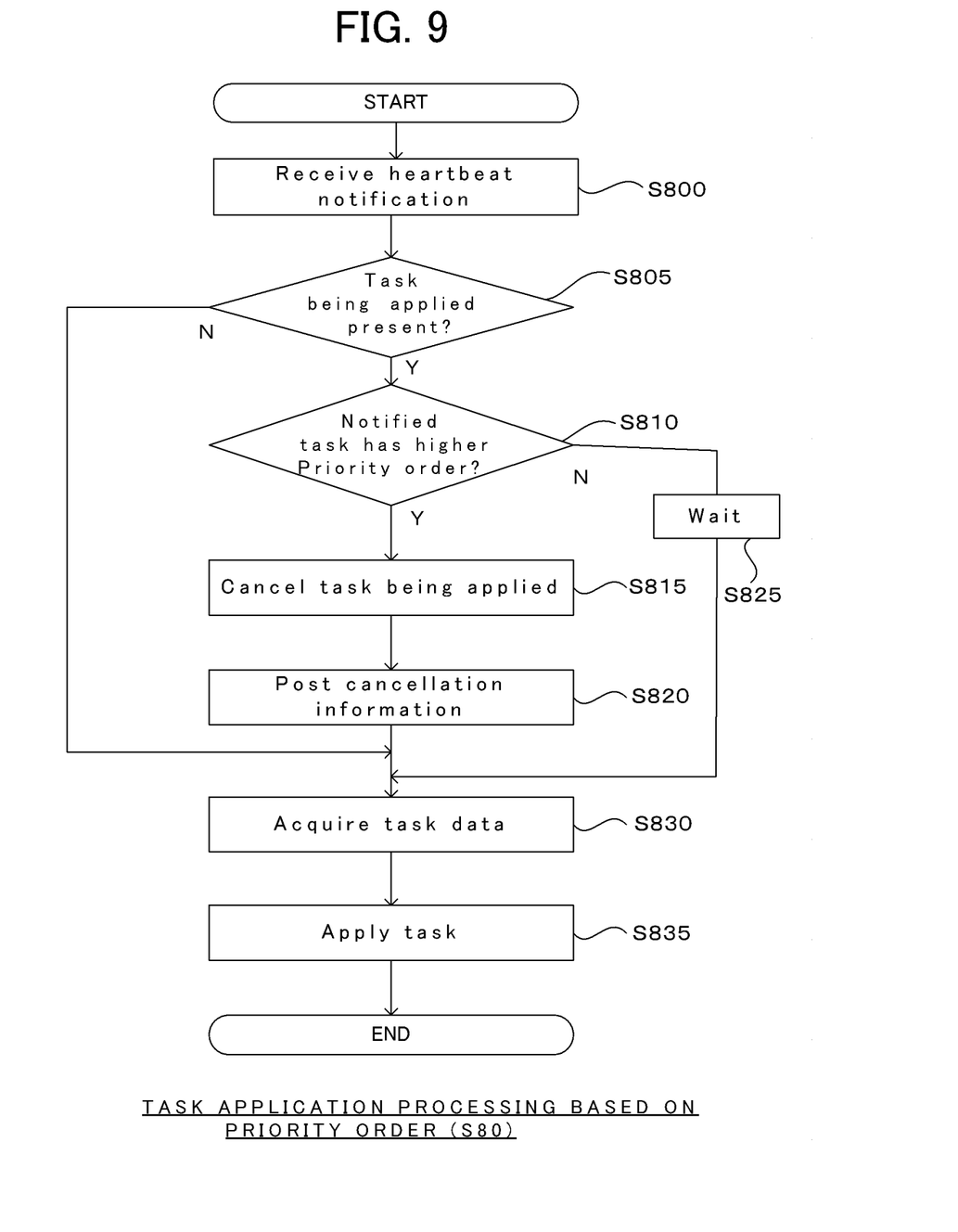
FIG. 9 is an explanatory flowchart of a task application processing based on a priority order (S80) by a client terminal 9.

FIG. 9 shows a task application processing (S80) based on a priority order by the client terminal 9.

As illustrated in FIG. 9, in step 800 (S800), the heartbeat transmission unit 700 receives task information as a response to heartbeat notification from the management server 5.

In step 805 (S805), the task decision unit 722 checks whether there is a task being applied. If there is the task being applied, the task application processing based on the priority order (S80) shifts to S810 and, if there is no task being applied, shifts to s830.

In step 810 (S810), the task decision unit 722 compares the priority order of the posted task and that of the task being applied. If the priority order of the posted task is higher than the order of the task being applied, the task application processing based on the priority order (S80) shifts to S815. If the priority order of the posted task is lower than the order of the task being applied, the task application processing based on the priority order (S80) shifts to S825.

In step 815 (S815), the task decision unit 722 notifies the task application unit 726 of cancellation of the task being performed currently so that the task application unit 726 may cancels the task being applied.

In step 820 (S820), the task application unit 726 notifies the heartbeat transmission unit 700 of the task having been canceled.

In step 825 (S825), the task application unit 726 waits until the task being applied is completed. After waiting, the task application processing based on the priority order (S80) shifts to step 830 (S830).

In step 830 (S830), the task acquisition notification unit 724 notifies the heartbeat transmission unit 700 that data of the posted task should be acquired, thereby acquiring the task data.

In step 835 (S835), the task application unit 726 applies the task and posts results of the application to the heartbeat transmission unit 700. The heartbeat transmission unit 700 posts the application results to the management server 5.

Figure 10:
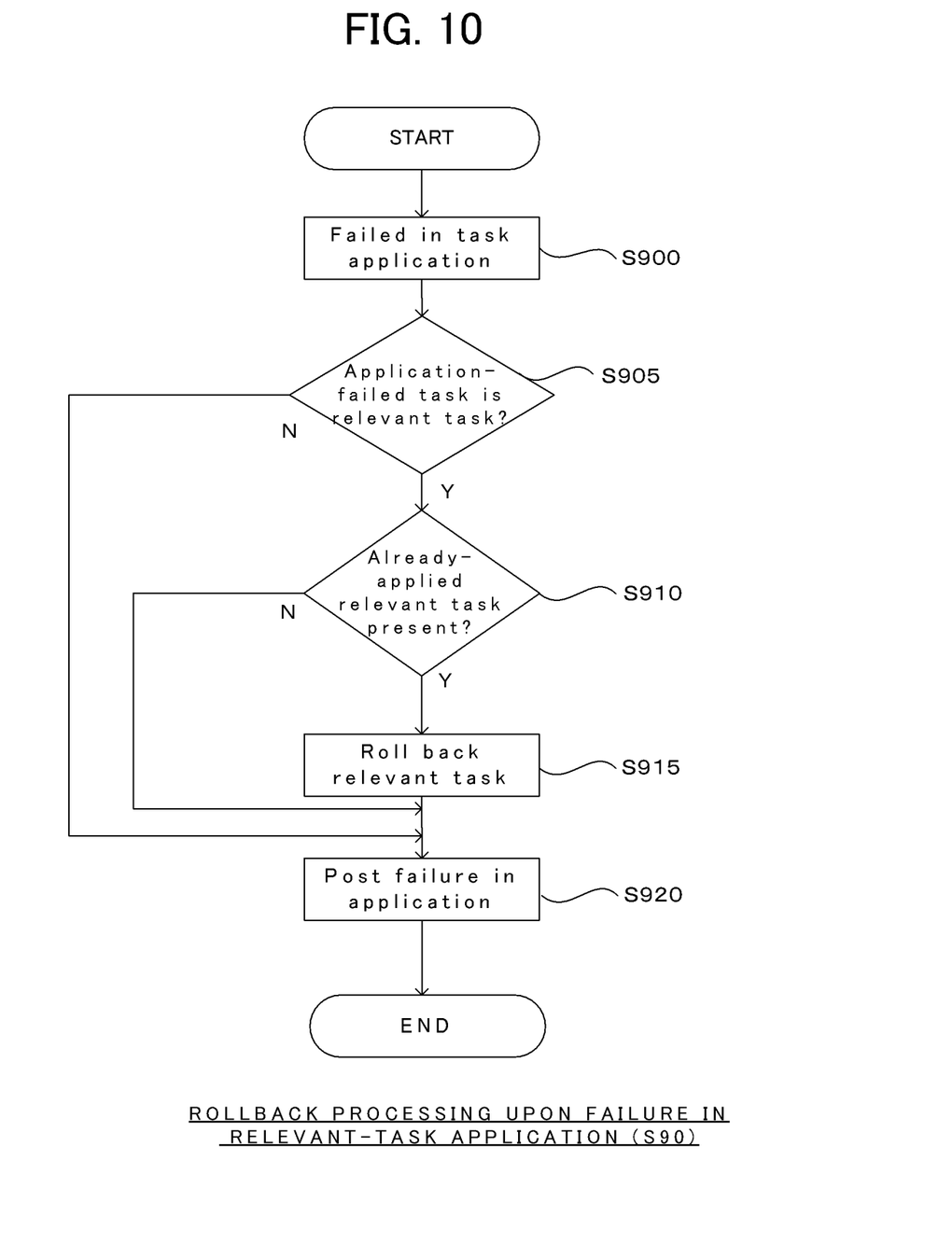
FIG. 10 is an explanatory flowchart of a rollback processing upon failure in a relevant-task application (S90)

FIG. 10 is an explanatory flowchart of a rollback processing (S90) upon failure in relevant-task application.

As illustrated in FIG. 10, in step 900 (S900), if having failed in application of a task, the task application unit 726 posts the failure in task application to the task decision unit 722.

In step 905 (S905), the task decision unit 722 decides whether the application-failed task is a relevant task. If it is the relevant task, the rollback processing upon failure in relevant-task application (S90) shifts to S910. If it is not the relevant task, the rollback processing upon failure in relevant-task application (S90) shifts to S920.

In step 910 (S910), the task decision unit 722 decides whether there is an already-applied relevant task. If it is present, the rollback processing upon failure in relevant-task application (S90) shifts to S915. If it is not present, the rollback processing upon failure in relevant-task application (S90) shifts to S920.

In step 915 (S915), the task application unit 726 rolls back the already-applied task.

In step 920 (S920), the task application unit 726 notifies the heartbeat transmission unit 700 of the failure in application. The heartbeat transmission unit 700 transmits the posted information to the management server 5.

Figure 11:
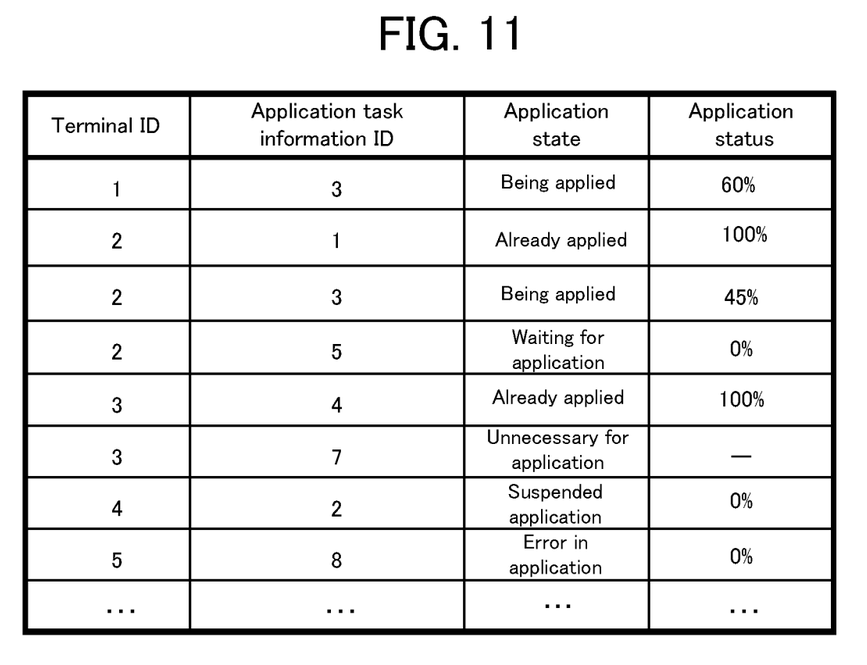
FIG. 11 is a table illustrating a task application status management table at a client terminal.

FIG. 11 is a table illustrating a task application status management table at the client terminal.

As illustrated in FIG. 11, the task application status management table is stored in the terminal information DB600. The task application status management table holds a terminal ID, an application task information ID, an application state, and an application status. The application state may include a state of a task being applied, a state of a task already applied, a state of a task whose application is suspended, and a state of failure in task application. The application-suspended state refers to a state where any one of a plurality of tasks scheduled to be applied to a target client terminal is found to have a priority order lower than the others and, therefore, need not immediately posted to the client terminal.

Figure 12:
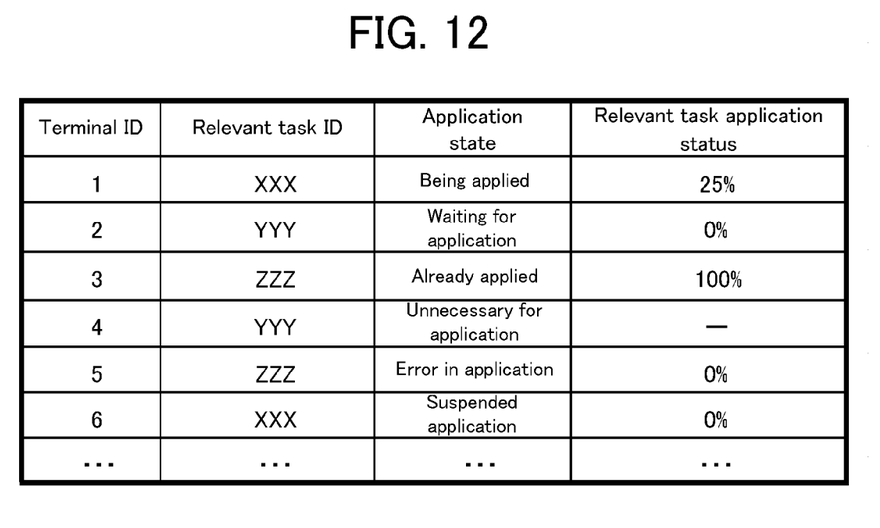
FIG. 12 is a table illustrating a relevant task application status management table at a client terminal.

FIG. 12 is a table illustrating a relevant task application status management table at the client terminal.

As illustrated in FIG. 12, the relevant task application status management table is stored in the terminal information DB600. The relevant task application status management table holds a terminal ID, a relevant task ID, an application state, and a relevant task application status. The application state may include a state of a task being applied, a state of a task already applied, a state of a task whose application is suspended, and a state of failure in task application. The application-suspended state refers to a state where any one of a plurality of tasks scheduled to be applied to a target client terminal is found to have a priority order lower than the others and, therefore, need not immediately posted to the client terminal.

As hereinabove described, in the data communication system 1 of the embodiment, the client terminal 9 periodically notifies the management server 5 of an operation status of the own machine by using a heartbeat, while the management server 5 inserts task information such as the data size of a data file required in a task into heartbeat reply information and posts it to the client terminal 9. In such a manner, the client terminal 9 acquires the data file required in task performance and performs the task based on the task information (data size) and the information of the own machine (resource status etc.). Further, since the operation status is periodically posted from the client terminal 9 to the management server 5, even in a network environment difficult to monitor the operation state owing to a firewall etc., the management server 5 can manage the operation state of the client terminal 9. Moreover, the client terminal 9 acquires a task type as the task information and, therefore, can uniquely decide whether it is necessary or not to perform the task. Further, the client terminal 9 acquires an estimated processing time required by the task and a period in which a data file required by the task is delivered as the task information and, therefore, can determine a data file acquisition timing and a task performance timing conveniently for the own machine. Those factors save on unnecessary data communication between the client terminal 9 and the management server 5 to contribute to a reduction in network load. Moreover, the client terminal 9 acquires and performs the task in accordance with the processing status at the own machine, so that improvements can be expected in service level by the own machine.

Next a description will be given of variations of the embodiment.

Although in the embodiment, the management server 5 has specified a time at which a task is acquired by the management server 5 from the client terminal 9; the task acquisition time may be specified as, for example, being before a specific time, being in a specific time zone, or being after a specific time.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A client terminal comprising:
a computer; and
a non-transitory recording medium storing a program,
wherein the program, when executed by the computer, configures the computer to function a transmission section that transmits heartbeat containing information denoting an operation state of at least an own machine to an external device periodically through http communication;
a preprocessing section that performs a preprocessing required in performance of a task in accordance with reply information for heartbeat transmitted from the transmission section; and
a performance section that performs the task after the preprocessing is performed by the preprocessing section, wherein:
the reply information contains information denoting a priority order of the task; and
the preprocessing section compares a priority order of the task being performed by the performance section and that of the task posted in the reply information and, if the priority order of the posted task is higher than the task being performed, cancels the task being performed, the client terminal further comprising a task control section that notifies the external device that the task is canceled by the preprocessing section, and
wherein if the task higher in priority order than the plurality of tasks correlated with each other is posted in the reply information, the task control section returns the correlated tasks already performed to their states before being performed and notifies the external device that the correlated tasks are canceled.

2. The client terminal according to claim 1, wherein:
the reply information contains a task type denoting a type of the task;
the preprocessing section decides whether it is necessary or not to performs the task, based on the task type; and
if it is decided by the preprocessing section that it is necessary to perform the task, the performance section performs the task.

3. The client terminal according to claim 2, wherein:
the reply information contains an information specifying timing that a data file is demanded;
the preprocessing section acquires the data file at a timing specified in the reply information;
the performance section performs the task by using the data file acquired by the preprocessing section.

4. The client terminal according to claim 1, wherein:
the reply information contains relevant task information denoting presence of a task to be performed next; and
the preprocessing section notifies an external device of completion of performance of the task as information demanding the task to be performed next, in accordance with the relevant task information contained in the reply information.

5. The client terminal according to claim 1, wherein if the reply information for transmitted heartbeat is not received in a predetermined period, the transmission section returns a heartbeat transmission time interval to a default value of an own machine.

6. The client terminal according to claim 1, wherein if any one of the plurality of tasks correlated with each other has failed, the task control section returns the other correlated tasks already performed to their states before being performed and notifies the external device that the correlated tasks are canceled.

7. The client terminal according to claim 1, wherein if a heartbeat transmission timing has arrived when the task is being performed, the transmission section notifies the external device of information denoting a progress of the task.

* * * * *